United States Patent [19]

Greenberger

[11] 4,019,846
[45] Apr. 26, 1977

[54] ROLLS IN A BRIQUETTING MACHINE OR LIKE MACHINES

[75] Inventor: Joseph Irwin Greenberger, Pittsburgh, Pa.

[73] Assignee: Wean United, Inc., Pittsburgh, Pa.

[22] Filed: Sept. 30, 1976

[21] Appl. No.: 728,500

Related U.S. Application Data

[63] Continuation of Ser. No. 584,240, June 5, 1975, abandoned.

[52] U.S. Cl. .................................. 425/194; 72/201
[51] Int. Cl.² ........................................ B28B 17/00
[58] Field of Search ......... 425/DIG. 235, 471, 505, 425/509, 329, 237, 335, 363, 407, 408, 194; 100/155, 176 R; 29/110; 72/200–201

[56] References Cited
UNITED STATES PATENTS

| | | | |
|---|---|---|---|
| 3,734,659 | 5/1973 | Harris | 425/78 |
| 3,907,485 | 9/1975 | Komerak | 425/471 |
| 3,907,486 | 9/1975 | Kennedy | 425/471 |

Primary Examiner—Richard B. Lazarus
Attorney, Agent, or Firm—Daniel Patch

[57] ABSTRACT

An arrangement for controlling the temperature of an arbor-sleeve type roll employed in a rolling process such as in a briquetting machine by transporting temperature control medium to the extremities of the working surface of a removable sleeve by providing in the arbor a system of passageways extending radially and terminating at a point beneath the outer surface of the arbor and by providing in the sleeve a system of interconnecting axially extending passageways. Both of these systems are joined by manifold ring assemblies mounted externally of the roll and which include an expandable bellows which compensate for thermal variation of the roll during the briquetting process. Two other rings, also mounted externally, are connected to the opposite sides of the arbor and sleeve, thereby preventing relative movement between the arbor and sleeve and still permitting the quick removal and replacement of the sleeve.

1 Claim, 3 Drawing Figures

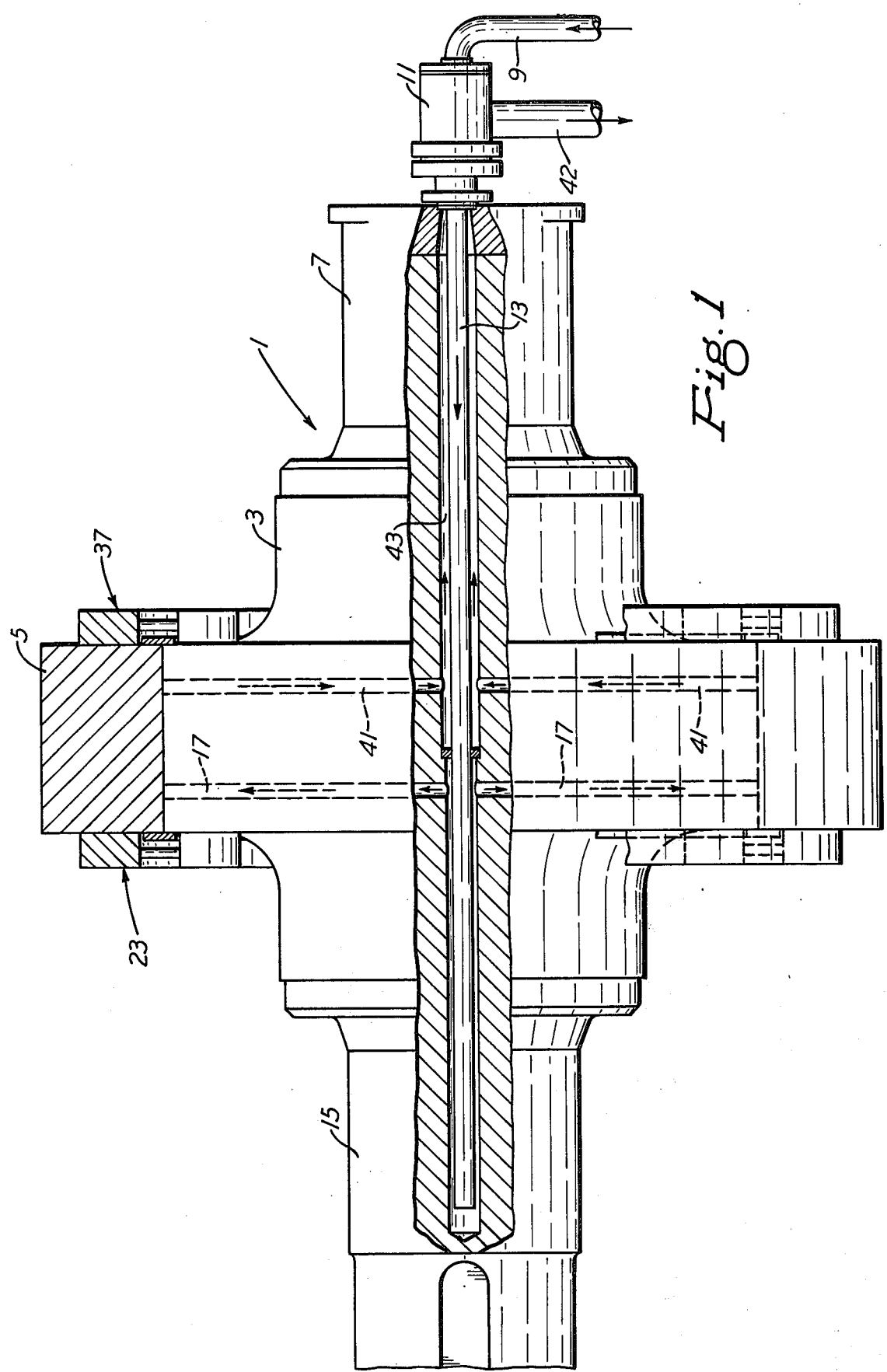

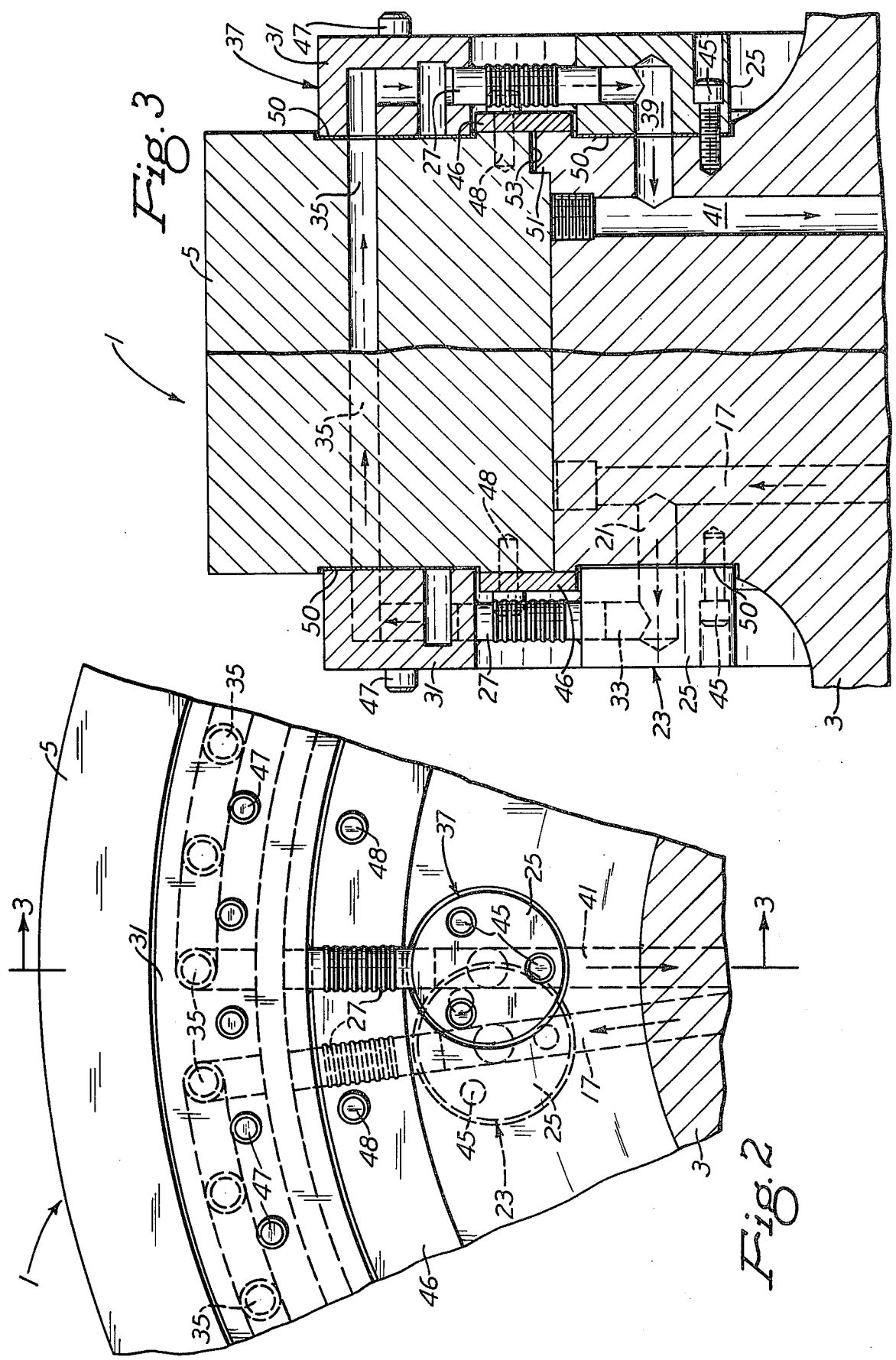

ROLLS IN A BRIQUETTING MACHINE OR LIKE MACHINES

This is a continuation of application Ser. No. 584,240, filed June 5, 1975, and now abandoned.

This invention pertains to an inprovement to rolls employed in a briquetting machine or other rolling machines for various materials.

Rolls in a briquetting machine are subject to temperatures ranging from 1600° to 1900° F during the feeding of material between the opposed rolls. One form of a briquetting machine is illustrated in the prior art, more particularly, U.S. Pat. No. 3,734,659, issued May 22, 1973, and filed Feb. 16, 1972. Since present briquetting roll construction or design does not readily permit cooling of the working surfaces, the arbors which are made of expensive, high alloyed materials have a limited life. Other rolls, such as those used in a rolling mill or calender, known in the art, are constructed to include a removable sleeve, but the construction is very complicated and requires the disassembling and assembling of a number of parts before the sleeve can be removed and replaced.

Therefore, it is an object of this invention to provide a composite roll consisting of an arbor and sleeve wherein the working surface of the sleeve, as well as the arbor journals, is temperature controlled to satisfy the working conditions of the roll.

In addition to reducing the overall cost of the rolls by providing a composite roll, it is another object of this invention to reduce the time and cost of machine down time and labor involved in removing the sleeve from the arbor by providing the roll with at least one external manifold ring assembly which includes a bellows and which is easily removed and replaced as a unit.

These objects, as well as other novel features and advantages of the present invention will be better understood when the following description of one embodiment thereof is read along with the accompanying drawings of which:

FIG. 1 is a partial sectional view of the construction of a sleeve and arbor type roll built in accordance with the present invention;

FIG. 2 is a partial sectional enlarged view of the manifold ring assembly shown in FIG. 1, and FIG. 3 is a sectional view taken on lines 3—3 of FIG. 2.

Referring first to FIG. 1, a composite roll, is illustrated, generally designated 1, which has an arbor 3 around which a sleeve 5 is removably secured. In a typical roll construction, the arbor may be made out of low grade alloy steel, while the sleeve of a high-wear resistant alloy steel. The sleeve may also be a composite structure, utilizing a high temperature base metal, for example, minimum alloy steel, plus a replenishable welded on surface of highly abrasive resistant composition.

As indicated by arrows, temperature control medium enters the right-hand arbor journals 7 through an entry pipe 9 and a rotary joint 11 and travels longitudinally through a center tube 13 to the opposite journal 15 thereby cooling both journals. The medium then travels to radial passageways 17 to a point adjacent the under surface of the sleeve 5. This medium can range in temperature and may consist of various fluids, but for the purpose herein, cold water at about 70° F to 90° F will be used. It should be noted that there are several radial passageways 17 in the arbor 3 which simultaneously carry the water through the arbor to the under surface of the sleeve 5.

After the water is brought to the extremities of the arbor, and as best shown in FIGS. 2 and 3,, the water is led from each passageway 17 to an opening 21, then to an external entry manifold ring assembly 23 consisting of an annular member 25, a hollow stainless steel bellows 27 and a full circle ring 31, which conveys the water from the arbor 3 to the sleeve 5. As seen best in FIG. 3, and as indicated by arrows, each manifold ring assembly forms a continuous passageway 33 that leads into a first of a series of essentially axial passageways 35 provided in the sleeve 5. As partially shown in FIG. 2, these holes 35 are set 3 to 4 inches below the working surface of the sleeve 5 and, as noted, are arranged to form a number of distinct series, each made up of five interconnecting parallel passageways, which series encircle the entire arbor.

The last passageway of each series is associated with an exit manifold ring assembly 37 similar to the assembly 23, but, as shown in FIG. 3, at the opposite side of the roll. Each assembly 37 forms a passageway 39 that feeds the returning water, as indicated by arrows, to a radial return passageway 41 formed in the arbor 3. As in the case of passageways 17, there is provided return passageways 41 for each series of passageways 35. Longitudinal passageways 43, shown in FIG. 1, convey the water back to the rotary joint 11 and to a discharge pipe 42.

Referring again to FIG. 2, three cap screws 45 secure each annular member 25 to the arbor 3; whereas two full circle rings 46 prevent relative movement between the sleeve and arbor, the rings 46 being secured to the sleeve by cap screws 48.

The bellows 27 are welded between the annular members 25 and the full circle rings 31, held to the sleeve by cap screws 47. In FIG. 3 the members 25 and rings 31 are separated from the arbor and sleeve, respectively, by suitable gaskets 50. The bellows 27, being yieldable, allows the arbor and sleeve to move relative to each other due to thermal variations. As shown in FIG. 3, at the right side, the arbor is provided with a projection 51 and the sleeve with a recess 53, the contacting surfaces preventing the sleeve 5 from moving in a direction to the right.

As mentioned previously, each hollow bellows 27, annular member 25 and full circle ring 31 form the manifold ring assemblies. This arrangement permits the sleeve to be detached rapidly and easily from the arbor. All that is required is first, from the right hand side of the roll assembly, as one views FIG. 3, the removal of the cap screws 47 from the full circle ring 31, leaving the ring in place, and the removal of the full circle ring 46 by removal of the cap screws 48. This allows the sleeve to be removed by simply removing the cap screws 45, on the left hand side, from the several annular members 25. With the removal of the sleeve, the right hand manifold assembly 37 remains attached to the arbor 3 whereas the manifold ring assembly 23, and the associated ring 46 on the left are carried away with the sleeve.

When replacing the sleeve, the new sleeve with a new manifold ring assembly attached, including an assembled full circle ring 46, is slid over the arbor until projection 51 of the arbor fits into the corresponding recess 53 of the sleeve, and the above removal process described is reversed.

By the above described arrangement it will be appreciated that not only is there provided an inexpensive and efficient arrangement for directly cooling the sleeve of an arbor-sleeve type briquetting roll, but the manifold ring assembly allows for quick removal and replacement of the sleeve thereby assuring maximum production of the machine.

In accordance with the provisions of the patent statues, I have explained the principle and operation of my invention and have illustrated and described what I consider to represent the best embodiment thereof.

I claim:

1. In a briquetting machine, an improvement for controlling the temperature of the working surface of a composite roll thereof having an axis of rotation relative to said machine consisting of:
 a passageway within the roll to permit termperature control medium to flow axially in an arbor on the roll,
 egress and ingress radial passageways within said arbor to permit temperature control medium to flow from and to said axial passageway to and from the outer portion of said arbor,
 a readily removable and replaceable sleeve arranged concentric about and supported by said arbor, said sleeve having an outer working surface,
 a system of passageways, including a series of axially spaced passageways, located beneath said working surface and formed in said sleeve to permit temperature control medium to flow continuously through said sleeve in a manner to control the temperature of said working surface, at least a first and a second of said passageways of said system of passageways terminating adjacent opposite ends of the roll; said series of axially spaced passageways formed into a number of distinct groups,
 a first number of manifold assemblies arranged external of and at one end of the roll,
 a second number of manifold assemblies arranged external of and at the opposite end of the roll,
 said first and second manifold assemblies connecting said radial passageways to said first and second passageways of said system of passageways to create an uninterrupted flow of temperature control medium through said arbor and said sleeve of the roll and serving as entry and delivery ports respectively for said groups,
 a set of first and second manifold assemblies being connected to each group of said groups of axially spaced passageways,
 said first manifold assemblies having first medium receiving means for receiving medium from said radial passageways for transfer to second medium receiving means,
 first fastening means for securing said receiving means to said arbor,
 a said second medium receiving means in each said first manifold assemblies for transferring medium to said first and second passageways of said system of passageways from said first receiving means,
 second fastening means for securing said other receiving means to said sleeve,
 said second manifold assemblies having third medium receiving means for transferring medium from said first and second passageways of said system of passageways to fourth medium receiving means,
 said fourth medium receiving means in each said second manifold assemblies for receiving medium from said third receiving means for transfer to said radial passageways,
 said second manifold assemblies having third and fourth fastening means similar in function to said first and second fastening means,
 a ring means arranged on said one end of the roll, and a ring means arranged on said opposite end of said roll,
 fifth and sixth fastening means for securing different ring means to said sleeve to their respective ends,
 said ring means having restraining portions which abut both said sleeve and arbor operative to restrain axial relative movement between said sleeve and arbor,
 said sleeve and said arbor having radial engaging surfaces on said opposite end of the roll arranged to prevent axial movement of the sleeve relative to said arbor in one axial direction, but allowing axial movement in an opposite axial direction,
 the construction being such that the removal of said first fastening means on said one end of the roll and the removal of said fourth and fifth fastening means on said opposite end of the roll allows said sleeve and said first manifold assemblies on said one end to be remmoved as a unit from said arbor while the second manifold assemblies on said opposite end remains attached to said arbor by said third fastening means.

* * * * *